US009888508B2

(12) United States Patent
Khoryaev et al.

(10) Patent No.: US 9,888,508 B2
(45) Date of Patent: Feb. 6, 2018

(54) D2D COMMUNICATION DEVICES AND METHOD OF TRANSMISSION FOR OVERLAPPED D2D RESOURCE POOLS

(71) Applicant: Intel Corporation, Santa Clara, CA (US)

(72) Inventors: Alexey Khoryaev, Dzerzhinsk (RU); Debdeep Chatterjee, Santa Clara, CA (US); Sergey Panteleev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 328 days.

(21) Appl. No.: 14/669,340

(22) Filed: Mar. 26, 2015

(65) Prior Publication Data

US 2016/0135239 A1 May 12, 2016

Related U.S. Application Data

(60) Provisional application No. 62/076,173, filed on Nov. 6, 2014.

(51) Int. Cl.
*H04J 3/16* (2006.01)
*H04W 76/02* (2009.01)
(Continued)

(52) U.S. Cl.
CPC ..... *H04W 76/023* (2013.01); *H04W 72/1289* (2013.01); *H04W 72/1247* (2013.01); *H04W 92/18* (2013.01)

(58) Field of Classification Search
CPC ..... H04W 56/002; H04W 8/005; H04W 4/02; H04W 52/345; H04W 72/0453;
(Continued)

(56) References Cited

U.S. PATENT DOCUMENTS 9,578,651 B2 * 2/2017 Ryu .................. H04W 72/1247
2012/0213183 A1 8/2012 Chen et al.
(Continued)

FOREIGN PATENT DOCUMENTS

WO WO-2016073111 A1 5/2016

OTHER PUBLICATIONS

"International Application Serial No. PCT/US2015/054157, International Search Report dated Feb. 23, 2016", 5 pgs.
(Continued)

*Primary Examiner* — Hanh N Nguyen
(74) *Attorney, Agent, or Firm* — Schwegman Lundberg & Woessner, P.A.

(57) ABSTRACT

An evolved Node-B (eNB), user equipment (UE) and method for handling overlapping resource pools for device-to-device (D2D) transmission are generally described. Resources for D2D communication with at least one other UE may be requested by the UE. The allocated pools may overlap. The overlapping pools may comprise pools of the same type or different types. The types of pools may include a discovery pool, a Scheduling Assignment (SA) pool and a Mode-2 data pool. The eNB may resolve conflict among the pools by transmitting an indication of allocation of only one of the pools or may permit the UE to determine which pool to use for transmission. The pool may be selected based on at least one of usage index, configuration identity, and usage priority. The usage index may include traffic types, mode switching, L2 control, UE classification, data rate, real-time/non-real time, latency, and Quality of Service (QoS).

24 Claims, 6 Drawing Sheets

(51) Int. Cl.
*H04W 92/18* (2009.01)
*H04W 72/12* (2009.01)

(58) Field of Classification Search
CPC ........... H04W 72/0446; H04W 76/023; H04W 72/0406; H04W 72/042
See application file for complete search history.

(56) References Cited

U.S. PATENT DOCUMENTS

| | | |
|---|---|---|
| 2013/0223353 A1 | 8/2013 | Liu et al. |
| 2016/0037512 A1* | 2/2016 | Lei ..................... H04W 56/003 370/336 |
| 2016/0219640 A1* | 7/2016 | Jung .................... H04W 72/02 |
| 2017/0048908 A1* | 2/2017 | Matsumoto ............... H04L 1/12 |

OTHER PUBLICATIONS

"International Application Serial No. PCT/US2015/054157, Written Opinion dated Feb. 23, 2016", 10 pgs.
"On Remaining Details of T-RPT Design for D2D Communication", R1-143765, 3GPP TSG RAN WG1 Meeting #78bis, Intel Corporation, (Sep. 27, 2014), 9 pgs.
"Remaining issues of Mode 1 resource allocation", R1-143203, 3GPP TSG RAN WG1 Meeting #78, Microsoft Corporation, (Aug. 10, 2014), 5 pgs.
Huawei, et al., "Mode 2 resource allocation for D2D", R1-142839, 3GPP TSG RAN WG1 Meeting #78, (Aug. 10, 2014), 6 pgs.

* cited by examiner

D2D COMMUNICATION DEVICES AND METHOD OF TRANSMISSION FOR OVERLAPPED D2D RESOURCE POOLS

PRIORITY CLAIM

This application claims the benefit of priority to U.S. Provisional Patent Application Ser. No. 62/076,173, filed, Nov. 6, 2014, and entitled "D2D TX BEHAVIOR IN CASE OF OVERLAPPED D2D RESOURCE POOLS," which is incorporated herein by reference in its entirety.

TECHNICAL FIELD

Embodiments pertain to radio access networks. Some embodiments relate to direct device-to-device communication in cellular networks.

BACKGROUND

With the ever-increasing demand for bandwidth, network resources in cellular networks, such as Long Term Evolution (LTE) networks, are under increasing strain. To increase capacity, the latest version of $3^{rd}$ Generation Partnership Project (3GPP) standards introduced direct communication between proximate user equipment (UE). Device-to-device (D2D) communications occur directly between UEs instead of conveying data between UEs through the radio and core network. D2D communication between UEs provides performance and efficiency enhancements in LTE networks, including improvements in coverage, spectral efficiency, data rates, and Quality of service (QoS), as well as enabling new services such as direct multimedia transmission between the UEs. D2D communication also provides an avenue for new peer-to-peer and location-based applications and services.

To enable D2D communications, UEs may transmit directly to other D2D using cellular resources. The UE may also desire to communicate with one or more different sets of UEs using the resources, which may cause issues if the resources overlap. It would thus be desirable to be able to resolve issues arising from overlapping D2D resources.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
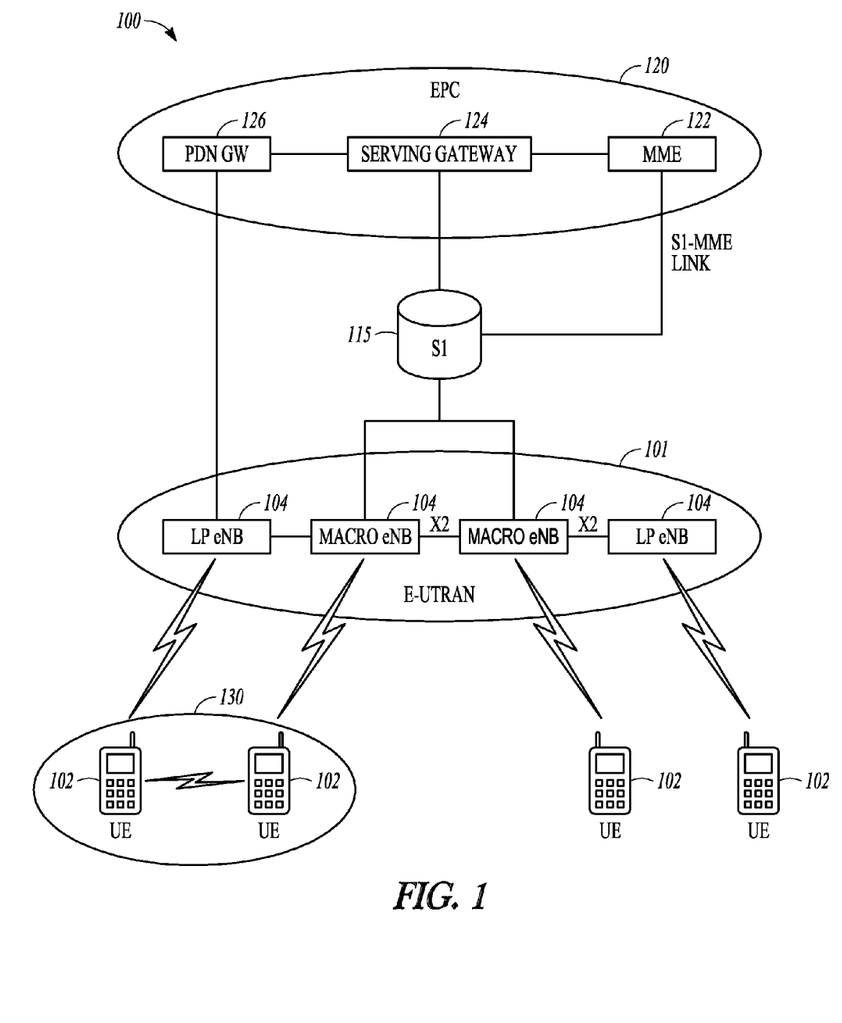
FIG. 1 shows an example of a portion of an end-to-end network architecture of an LTE network with various components of the network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include evolved node Bs (eNBs) 104 (which may operate as base stations) for communicating with user equipment (UE) 102. The eNBs 104 may include macro eNBs and low power (LP) eNBs. Certain UEs 102, shown in cluster 130, may be able to communicate directly with each other via device-to-device (D2D) communications rather than use the eNB 104, in addition to communicating with each other or other UEs 102 using the eNB 104.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 may terminate an SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA or SC-FDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, such as the LTE unlicensed band, or may operate on different frequency bands with each cell operating in a different frequency band or only cells of different sizes operating on different frequency bands. As used herein, the term low power (LP) eNB refers to any suitable relatively low power eNB for implementing a narrower cell (narrower than a macro cell) such as a femtocell, a picocell, or a microcell. Femtocell eNBs may be typically provided by a mobile network operator to its residential or enterprise customers. A femtocell may be typically the size of a residential gateway or smaller and generally connect to the user's broadband line. The femtocell may connect to the mobile operator's mobile network and provide extra coverage in a range of typically 30 to 50 meters. Thus, a LP eNB might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB via an X2 interface. Picocell eNBs or other LP eNBs may incorporate some or all functionality of a macro eNB. In some cases, this may be referred to as an access point base station or enterprise femtocell.

Figure 3A:
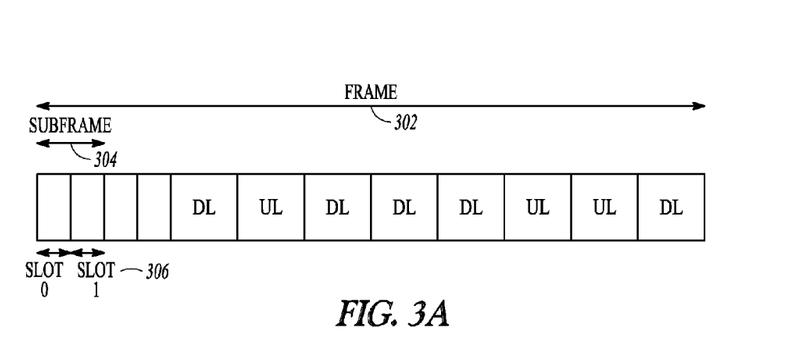
FIGS. 3A-3C illustrates LTE frames in accordance with some embodiments.
Figure 3B:
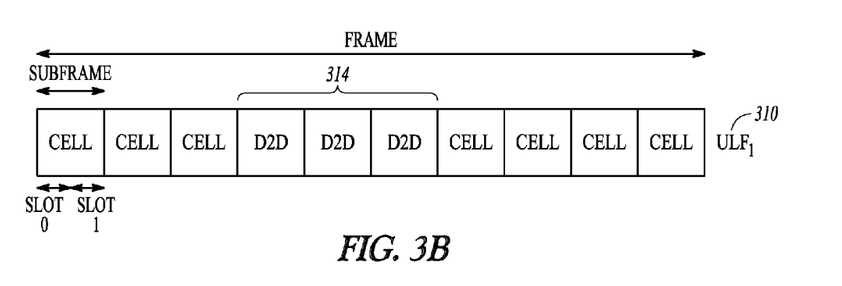
Figure 3C:
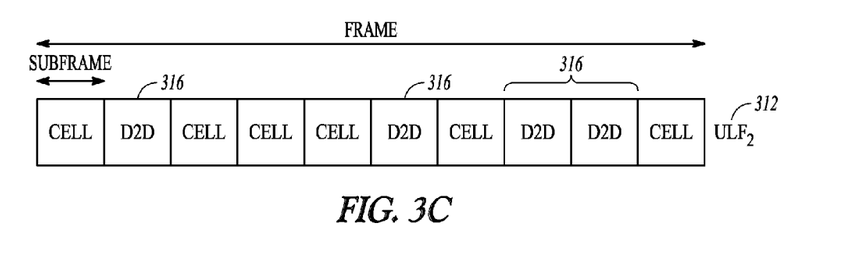

Communication over an LTE network may be split up into 10 ms frames, each of which may contain ten 1 ms subframes. FIGS. 3A-3C illustrates LTE frames in accordance with some embodiments. Each subframe 304 of the frame 302, in turn, may contain two slots 306 of 0.5 ms, although in FIG. 3A two slots 306 are shown only in the first two subframes 304 of the frame 302 for convenience. Each subframe 304 may be used for uplink (UL) communications from the UE to the eNB or downlink (DL) communications from the eNB to the UE. In one embodiment, the eNB may allocate a greater number of DL communications than UL communications in a particular frame 302. As shown in FIGS. 3B and 3C, the eNB may schedule transmissions over a variety of frequency bands ($f_1$ and $f_2$). The allocation of resources in subframes used in one frequency band 310 and may differ from those in another frequency band 312. As shown in FIGS. 3B and 3C, all of the subframes of frequency band 310 and frequency band 312 are allocated to UL communications, although in other embodiments it may be likely that some subframes are allocated to UL communications and others to DL communications. In FIG. 3B, the $4^{th}$-$6^{th}$ subframes in frequency band 310 may be allocated to D2D communications, while the remaining subframes may be allocated for UL cellular communications. Similarly, in FIG. 3C, the $2^{nd}$, $6^{th}$ and $8^{th}$-$9^{th}$ subframes in frequency band 312 may be allocated to D2D communications with the remaining subframes allocated for UL cellular communications. D2D resources may be allocated in pools 314, 316, as further described below.

Figure 4:
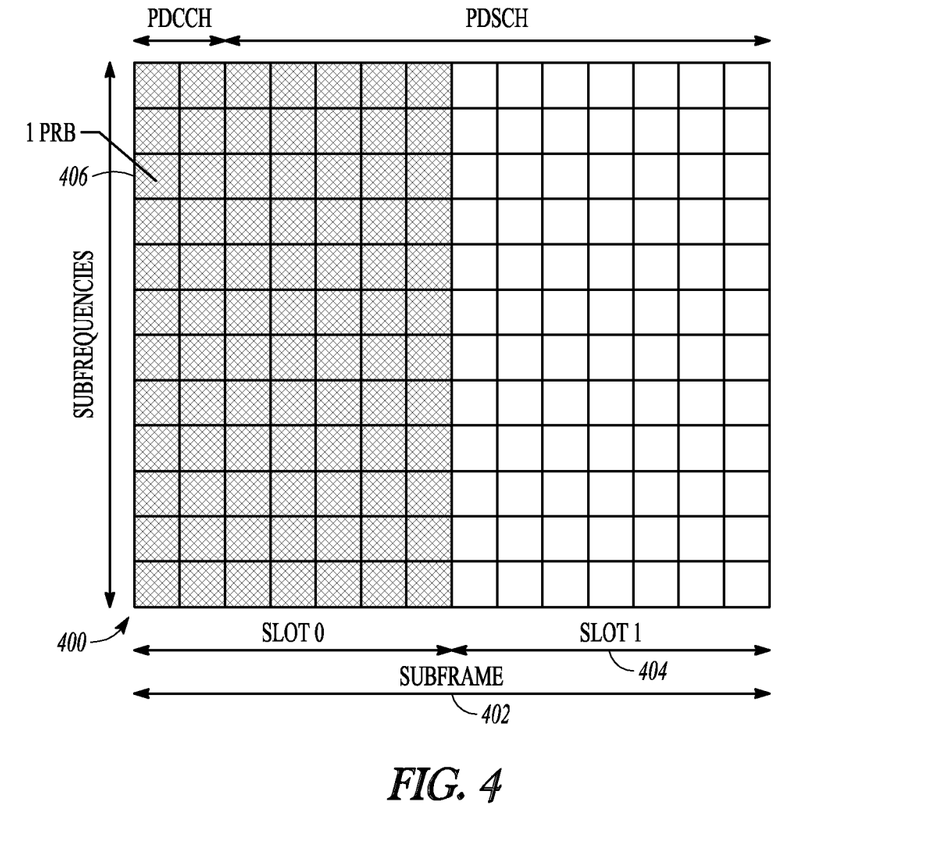
FIG. 4 shows a subframe in accordance with some embodiments.

FIG. 4 shows a subframe in accordance with some embodiments. Each slot 404 of the subframe 402 may contain 6-7 symbols 406, depending on the system used. In one embodiment, the subframe 402 may contain 12 frequency resource elements also called subcarriers. A downlink resource grid may be used for downlink transmissions from an eNB to a UE, while an uplink resource grid may be used for uplink transmissions from a UE to an eNB or from a UE to another UE. The resource grid 400 may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid 400 may contain resource blocks (RBs) that describe the mapping of physical channels to resource elements and physical RBs (PRBs) 406. A PRB 406 may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid 400 in the time domain corresponds to one subframe or two resource blocks. Each resource grid may comprise 12 (subcarriers)*14 (symbols)=168 resource elements.

There may be several different physical downlink channels that are conveyed using such resource blocks. Two of these physical downlink channels shown in FIG. 4 may be the physical down link control channel (PDCCH) and the physical downlink shared channel (PDSCH). Each subframe may be partitioned into the PDCCH and the PDSCH. The PDCCH may normally occupy the first two symbols of each subframe and carries, among other things, information about the transport format and resource allocations related to the PDSCH channel, as well as H-ARQ information related to the uplink shared channel. The PDSCH may carry user data and higher-layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that tell the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

The PDCCH may use CCEs (control channel elements) to convey the control information. Before being mapped to resource elements, the PDCCH complex-valued symbols may be first organized into quadruplets, which may be then permuted using a sub-block inter-leaver for rate matching. Each PDCCH may be transmitted using one or more of these CCEs, depending on the size of DCI and the channel condition, where each CCE corresponds to nine sets of four physical resource elements known as resource element groups (REGs). Four QPSK symbols are mapped to each REG. There may be four or more different PDCCH formats defined in LTE with different numbers of CCEs (e.g., aggregation level, L=1, 2, 4, or 8).

Figure 2:
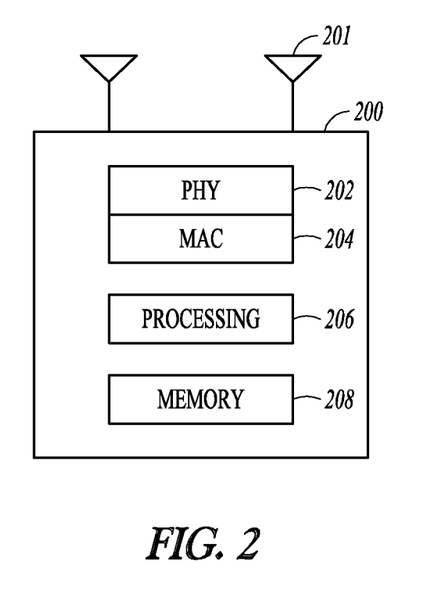
FIG. 2 illustrates a functional block diagram of a communication device in accordance with some embodiments in accordance with some embodiments.

FIG. 2 illustrates a functional block diagram of a communication device (e.g., an UE or eNB) in accordance with some embodiments. The communication device 200 may include physical layer (PHY) circuitry 202 for transmitting and receiving radio frequency electrical signals to and from the communication device, other eNBs, other UEs or other devices using one or more antennas 201 electrically connected to the PHY circuitry. The PHY circuitry 202 may include circuitry for modulation/demodulation, upconversion/downconversion, filtering, amplification, etc. Communication device 200 may also include medium access control layer (MAC) circuitry 204 for controlling access to the wireless medium and to configure frames or packets for communicating over the wireless medium. The communication device 200 may also include processing circuitry 206 and memory 208 arranged to configure the various elements of the cellular device to perform the operations described herein. The memory 208 may be used to store information for configuring the processing circuitry 206 to perform the operations.

In some embodiments, the communication device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable device, a sensor, or other device that may receive and/or transmit information wirelessly. In some embodiments, the communication device 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the communication device 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and different channel characteristics that may result between each of the antennas of a receiving station and each of the antennas of a transmitting station. In some MIMO embodiments, the antennas may be separated by up to $1/10$ of a wavelength or more.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The embodiments described may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the processing circuitry 206 may be configured to receive OFDM communication signals over a multicarrier communication channel in accordance with an OFDMA communication technique. The OFDM signals may comprise a plurality of orthogonal subcarriers. In some broadband multicarrier embodiments, the cellular device 200 may operate as part of a broadband wireless access (BWA) network communication network, such as a Worldwide Interoperability for Microwave Access (WiMAX) communication network or a $3^{rd}$ Generation Partnership Project (3GPP) Universal Terrestrial Radio Access Network (UTRAN) or a LTE communication network, an LTE-Advanced communication network, a fifth generation (5G) or later LTE communication network or a high speed downlink/uplink access (HSDPA/HSUPA) communication network, although the scope of the invention is not limited in this respect.

As above, to increase network capacity, cellular networks are turning to D2D communications. Rather than providing communications between UEs through the RAN and core networks, D2D communications may provide communications directly between UEs in addition to or instead of communicating between the UEs using through the eNB. While D2D communications may use any communication technology, e.g., operating on the same frequency band as communications with the eNB, the eNB may still be responsible for allocating the D2D communications via RRC messages with the UE. Thus, while the UE may receive control information from an eNB that is used in communicating data between the UE and the eNB, at least because D2D communication uses frequency bands of the cellular network, communication directly between the UEs may still be scheduled by the eNB. That is, to retain control of the overall network resources the eNB may provide control information to a UE for transmission. The control information may include an indication of resource allocation for transmission by the UE to avoid collision of the resources with other transmissions within the cellular network. In one embodiment, the allocation may be specifically designated for the UE, which may be referred to as Mode-1. In another embodiment, the allocation may be for D2D communications among the UE, which may be referred to as Mode-2, and comprise all uplink (UL) spectrum resources. In Mode-2 D2D communications, resources may be autonomously selected by the transmitting UE using a random, contention-based or RSRP based discovery mechanism, for example, and may be defined within Mode-1 resources.

Figure 5:
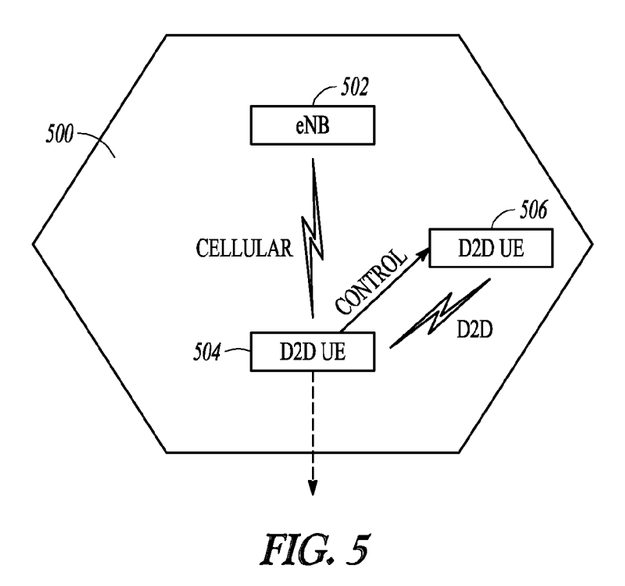
FIG. 5 illustrates a UE transitioning to out of coverage range in accordance with some embodiments.

The eNB may transmit an indication of the resources allocated for separate D2D transmission functions to the UE using, for example, RRC signaling. The transmission functions may include D2D device discovery, data scheduling (scheduling assignment (SA)) and data. FIG. 5 illustrates a UE transitioning to out of coverage range in accordance with some embodiments. As shown in FIG. 5, the eNB 502 may allocate D2D resources during uplink (UL) subframes using time or frequency division multiplexing in a UL frequency band. The subframes used may vary, dependent on the frame and frequency band. A frame may contain both subframes allocated to D2D communications and subframes allocated to cellular communications. UL subframes that are configured for D2D transmission may be referred to as D2D subframes. A set of D2D subframes may be referred to as a D2D resource pool. The D2D resource pool may include contiguous subframes or non-contiguous subframes. The D2D resource pool may include resources for D2D transmission and D2D reception.

One or more D2D transmission resource pools may be configured by the eNB for a particular UE. Each resource pool may have associated characteristics, including, for example, a usage index (e.g. public safety or commercial usage of the resource pool), a configuration identity (e.g. Mode-1 or Mode-2), and an associated priority (e.g., only for public safety users level 2 or higher). One or more of the characteristics may be associated with conditions to be satisfied to utilize the particular D2D resource pool for transmission. In one embodiment, usage indices for D2D transmission resource pools may include, for example, traffic types, switching between Mode-1 and Mode-2, introduction of pools for L2 control, UE classification, and the ability to operate essentially seamlessly in partial coverage, among others. In one embodiment, a traffic type may include a data rate (such as high or low), whether the data is real time or non-real time, latency of the data, and Quality of Service (QoS) associated with the data. In general, a UE may switch between Mode-1 and Mode-2 pools dependent, for example, on UE location. FIG. 5 illustrates UE transitioning towards out of coverage range in accordance with some embodiments. In FIG. 5, the UE 504 may initially be within the cell 500 served by the eNB 502 and communicate cellular data and control signals with the eNB 502. The UE 504 may currently transmit in Mode-1 D2D communication with another UE 506. As the UE 504 leaves coverage, either being in partial coverage or going out of coverage range of the serving eNB 502 (perhaps being handed off to another, unshown, eNB), the UE 504 may signal with a control signal the other UE 506 that the UE 504 is to enter Mode-2 communications with the other UE 506 due to loss of communication with the controlling eNB 502.

Moreover, different UEs may in addition have different classifications or prioritization. Thus, a UE may be a public safety UE, a commercial UE or a personal UE and the corresponding prioritization may be higher for the public safety UE than for the commercial UE independent of the type of traffic sent. The usage index and priority may include geographic ranges for discovery, SA and data transmission. The geographic ranges may be independent of each other or may all be dependent, e.g., on characteristics of the UE and/or of the traffic. An indication of the geographical range for each D2D resource pool may be provided to the UE by the eNB or may be left to the UE, for example, for determination of effectiveness of D2D communications.

In one embodiment, up to four D2D transmission resource pools may be configured for a particular UE so that the UE may transmit in each pool. In embodiments, in which a UE is configured with multiple D2D transmission resource pools, in some embodiments the D2D transmission resource pools may be of any type but may not overlap. The UE may, however, transmit to multiple UEs within a single resource pool, as well as to different UEs in different resource pools. In some circumstances, it may thus be difficult to avoid time and/or frequency overlap between the Mode-2 Discovery, SA and Data pools, especially when the same UE is allocated transmission using multiple pools. This is to say that the eNB and/or UE may resolve which D2D transmission resource pool takes precedence (i.e., the resource pool that the UE is to transmit on) when at least two of the D2D transmission resource pools conflict through overlap.

To resolve which D2D transmission resource pool to use, the eNB and/or UE may turn, among others, to the pool function. A first of the functions before transmission of D2D data may take place may be for the UEs to discover the presence of other proximate UEs that are capable of D2D communication. To accomplish this, a UE may monitor for discovery signals transmitted from other UEs. Upon reception of discovery signals, the UE may create a list of UEs with which the UE is able to communicate. The UE may also transmit a discovery signal using the discovery resources allocated by the eNB. The eNB may control the discovery process by limiting the UEs that may transmit a discovery signal, as well as setting the timing of the discovery signal for each UE, the information contained in the discovery signal and the response to the discovery signal. As above, the UE may select (Mode-2) or may be assigned by the eNB (Mode-1) a transmission resource pool not used by the other UEs as a discovery resource pool and broadcast a discovery signal to the other UEs using the discovery resource pool. Discovery by a UE transmitter may be either Type 1 discovery, which is contention-based D2D discovery, or Type 2 discovery, which is non-contention based D2D discovery. In one embodiment, discovery resource pools may be allocated as Type-1 or Type-2, while in another embodiment the eNB may simply allocate the discovery resource pool and permit the UE to determine whether to use Type-1 or Type-2 discovery. D2D communications with one or more UEs in the discovery list may then be scheduled by the UE using a resource pool allocated for SA before data is conveyed between the UEs using resources allocated for and data transmission.

Generally, D2D transmission resource pools may overlap in either or both time or frequency. Either the same type of D2D transmission resource pools may overlap or different types of D2D transmission resource pools may overlap. Overlap of the same type of D2D transmission resource pools may include multiple Mode-2 SA pools overlapping, Mode-2 Data pools overlapping, Type 1 Discovery pools overlapping or Type 2B Discovery pools overlapping. Resources may not fully overlap in time and frequency, e.g., the resources may overlap in time or frequency only. In some embodiments the UE may be expected to transmit D2D communications on contiguous resources (both time and subcarrier) in a particular subframe. In one embodiment of overlapping D2D transmission resource pools, a maximum supported size of combined resource pools (e.g., the sum of Mode 1 and Mode 2 SA resource pools) may be set by the network. In one example, it may be acceptable for SA resources to overlap in time but not in frequency, allowing frequency division multiplexing (FDM) of the signals. In one embodiment of such an example, the maximum supported size of the combined SA resource pools (i.e., the sum of Mode 1 and Mode 2 SA resource pools) may be 50.

Overlap of different types of D2D transmission resource pools may include overlap between: SA and data pools, SA and discovery pools, data and discovery pools, Mode-1 and Mode-2 (data or SA) pools and Type 1 and Type 2B discovery pools. Similar to the above, it may be acceptable for different types of D2D transmission resource pools to partially overlap, for example in frequency but not time. In one embodiment of such a case, a maximum supported size of combined resource pools may be set by the network. In other embodiments, no overlap of D2D transmission resource pools may be acceptable when the D2D transmission resource pools are of different types.

Another of the functions before transmission of D2D data may take place may be for the UEs to schedule subsequent transmission of the data with one or more other UEs using one or more SA resource pools. In one embodiment, the UE may transmit a single SA resource per SA pool, with multiple SA pools available for the UE. In another embodiment, the eNB may configure the UE with (or otherwise indicate to the UE) a maximum number of SA resources within a pool and/or SA pools for transmission to different UEs. The maximum number of SA resources within a single pool configured by the eNB for the UE in this case may be greater than 1 and, in one embodiment, may specifically be 1 or 2 SA resources per SA pool. Similarly, the maximum number of SA resources within a set of pools configured by the eNB for the UE may be greater than 1 for at least one of the pools, and may differ or may remain the same among the pools. In another embodiment, if transmission of multiple SA resources within a D2D transmission resource pool is enabled by the eNB, the UE may be limited to transmission using time-orthogonal (i.e., non-overlapping in time) SA and data D2D resources.

In some embodiments, overlap of the D2D transmission resource pools may simply be prohibited by the network. In one such embodiment, the eNB may not allocate overlapping D2D transmission resource pools nor transmit an indication of allocation of overlapping transmission resource pools to the UE. In some embodiments, the eNB may allocate only one D2D transmission resource pool to a particular UE and transmit an indication of the allocation. In other embodiments, the eNB may allocate (and provide an indication of the allocation) to a particular UE only D2D transmission resource pools that do not overlap, or select the Time Resource Pattern (T-RPT) to avoid overlap in time (but perhaps allow overlap in frequency). In some embodiments, the eNB may select one of the overlapping D2D transmission resource pools to allocate to the particular UE based on pool usage index and/or pool priorities, among others, as indicated above.

In some Mode-2 embodiments, the eNB may allocate overlapping D2D transmission resource pools and leave pool selection up to the UE, after indicating the allocation of both D2D transmission resource pools to the UE. In such embodiments, the UE may signal to the eNB which pool has been selected to enable later selection by the eNB and/or transmission of control signals by the eNB to other network elements or UEs. In some embodiments, the UE may select one of the overlapping Mode-2 D2D transmission resource pools based on pool usage index and/or pool priorities. In some cases, the Mode-2 D2D transmission resource pools may have the same usage index and either no pool priorities or the same pool priorities. In this case, the network may configure the manner of selection of Mode-2 D2D transmission resource pools by the UE prior to transmission of the indication of the allocation or leave selection up to the UE. The manner of selection may be, for example, random, contention-based or RSRP based (e.g., the highest RSRP). In other embodiments, if the pool usage index of the Mode-2 transmission resource pools is not configured by the eNB, the UE may determine which Mode-2 D2D transmission resource pool to use for D2D communication.

In some embodiments, Mode-2 usage indices may not be configured and the UE may determine which D2D transmission resource pool to select. However, D2D receivers may expect a transmission by the UE transmitter during a particular D2D transmission resource pool, e.g., based on previous transmission by the UE. This may present an issue when the UE has determined to switch from one D2D transmission resource pool to a newly overlapping D2D transmission resource pool. In this case, Layer 2 (L2) signaling between the UEs may be used to inform the D2D receivers about an upcoming switching among the Mode-2 transmission resource pools. In other embodiments, the UE transmitter may signal the eNB which of the overlapping Mode-2 transmission resource pools is to be selected, and the eNB may transmit the L2 signal to the D2D receivers to inform the D2D receivers about the upcoming switching among the Mode-2 transmission resource pools. This may permit the D2D receivers to keep track of the D2D transmitters and transmissions.

As above, whether or not Mode-2 usage indices are configured, the eNB may configure the relative Mode-2 D2D transmission resource pool priorities. Priority indicators may be used by the eNB to define an order to switch allocation (or allow the UE to determine which D2D transmission resource pool to select) between Mode-1 to Mode-2 transmission resource pools or between Mode-2 D2D transmission resource pools. In addition, the pool priority may be used to resolve conflicts when Mode-2 D2D transmission resource pools with the same usage index overlap in time.

In an embodiment in which the UE also has a priority, the UE priority may be determined by the eNB. The eNB may then use UE-specific signaling to transmit the UE priority to the UE and the UE may use the assigned priority to determine which D2D transmission resource pool to select. In some embodiments, the UE may only select D2D transmission resource pools with the same UE priority. In other embodiments, the UE may select any D2D transmission resource pool having a priority that is at most the priority of the UE.

As noted above, in certain cases, it may be acceptable for transmission resource pools to overlap partially, for example in time but not in frequency, allowing in certain cases frequency division multiplexing (FDM) of the signals. For example, in some embodiments of the same type of D2D transmission resource pools overlapping, Type 2B discovery pools may not overlap in both time and frequency. Similarly, in some embodiments of different types of D2D transmission resource pools Type 2B and Type 1 Discovery pools may not overlap in both time and frequency. In either embodiment, the discovery pools may be multiplexed by the eNB, while the UE may be expected to transmit D2D discovery signals on contiguous resources (both time and subcarrier) in a particular subframe. In situations in which the eNB multiplexes multiple Type 2B Discovery pools, however, the eNB may be limited to not allocating both discovery resources to a single UE. Multiplexing D2D discovery transmissions may raise issues caused by allocating a discovery transmission that is non-contiguous in frequency on the same subframe. Moreover, as frequency hopping caused by FDM may occur either between subframes (inter-subframe) or within a subframe (intra-subframe), whether the UE may be allocated multiple discovery pools may depend on the exact dimensions and hopping parameters configured for each of the pools, as time-domain collisions may happen at the UE transmitter due to inter-subframe Type 2B resource hopping even if the initial allocation of the discovery resources are on different subframes. Thus, in one embodiment, if multiple Type 2B discovery pools are multiplexed by the eNB using FDM, the same UE may not be allocated UE-specific discovery resources belonging to the multiple FDM Type 2B discovery pools. Alternatively, multiple Type 2B discovery resources may be allocated to a single UE within the same Type 2B discovery resource pool, in response to, for example, multiple Type 2B discovery resource requests from the UE for different applications.

In another embodiment, however, the eNB may not make the allocation determination for multiple Type 2B resource pools. Instead, the UE may make the determination based on the UE implementation if the UE determines that a time-domain collision between the Type 2B discovery pools exists.

Figure 6:
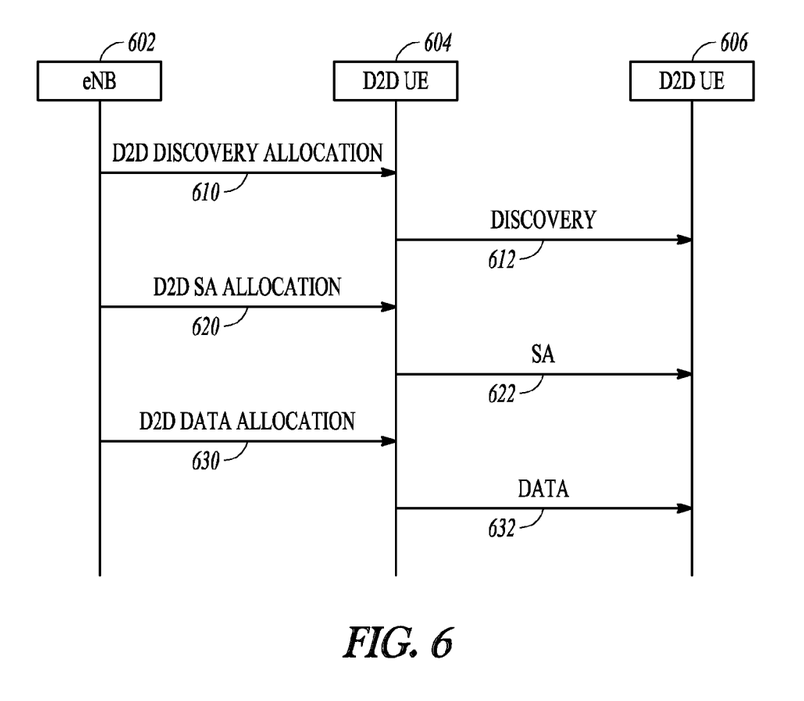
FIG. 6 illustrates a communication diagram in accordance with some embodiments.

FIG. 6 illustrates a communication diagram in accordance with some embodiments. In the communication diagram, the eNB 602 may transmit an indication of one of a plurality of overlapping D2D discovery resource pool allocations to a UE 604. In some embodiments, the eNB may transmit an indication of multiple overlapping discovery resource pool allocations to the UE 604 in which the UE 604 may determine which of the overlapping discovery resource pool allocations to use and which of the overlapping discovery resource pool allocations to avoid using. In either case, the UE 604 may subsequently transmit a discovery signal to another UE 606 using the appropriate discovery resource pool.

In FIG. 6, the eNB 602 may transmit an indication of one of a plurality of overlapping D2D SA resource pool allocations to the UE 604. In some embodiments, the eNB 602 may transmit an indication of multiple overlapping SA resource pool allocations to the UE 604. In such embodiments, the UE 604 may determine which of the overlapping SA resource pool allocations to use and which of the overlapping SA resource pool allocations not to use. The UE 604 may then transmit a SA signal to the other UE 606 using the appropriate discovery resource pool.

The eNB 602 may also transmit an indication of one of a plurality of overlapping D2D data resource pool allocations to the UE 604. In some embodiments, the eNB 602 may transmit an indication of multiple overlapping data resource pool allocations to the UE 604. In such embodiments, the UE 604 may determine which of the overlapping data resource pool allocations to use and which of the overlapping data resource pool allocations not to use. The UE 604 may then transmit data to the other UE 606 using the appropriate discovery resource pool.

Although shown as separate allocations, the eNB 602 may, in some embodiments, provide an indication containing multiple D2D transmission resource pool allocations to the UE 604 at the same time. This indication may specify both overlapping and non-overlapping D2D transmission resource pool allocations for the UE 604.

Figure 7:
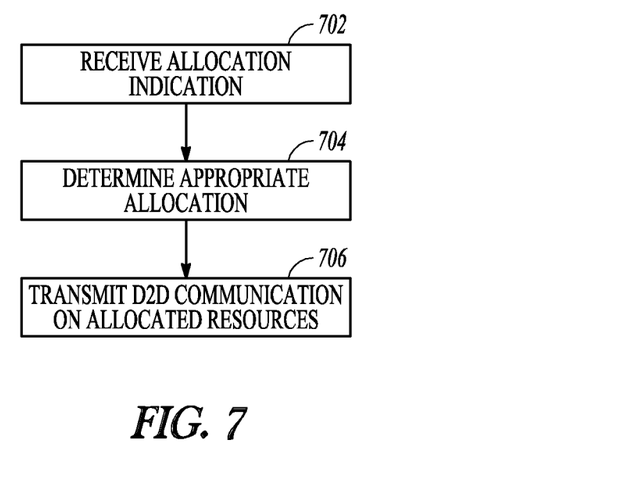
FIG. 7 illustrates a flowchart of a method of D2D communication in accordance with some embodiments.

FIG. 7 illustrates a flowchart of a method of D2D communication in accordance with some embodiments. FIG. 7 in particular illustrates one embodiment of a method that may be performed. by a UE. As shown, at step 702 the UE receives an indication of an allocation of D2D transmission resources of a D2D transmission resource pool. The indication may include a plurality of overlapping D2D transmission resource pools, which may be of the same type or different types. Alternatively, the indication may be of a single D2D transmission resource pool that has been preselected from among a plurality of overlapping D2D transmission resource pools by the eNB.

At step 704, in response to the UE receiving an indication of overlapping resource pool allocations to use, the UE may determine which overlapping discovery resource pool allocation to use and which overlapping discovery resource pool allocation not to use. As described above, the determination by the UE (or eNB)may be based, for example, on pool usage index, pool priorities, traffic or UE characteristics. Determination of which overlapping D2D transmission resource pool to use may be eliminated in response to the UE receiving an indication from the eNB that does not contain overlapping resource pool allocations.

At step 706, the UE may subsequently transmit the appropriate D2D signal to another UE using the allocated resource pool. The D2D signal may be a discovery signal, an SA signal or data for the other UE. Control signals to the D2D receiver UE for the D2D transmission resource pool may also be provided from the. RAN, for example, by the eNB, or by the D2D transmitter UE. In some embodiments, the UE may be capable of only transmission or reception of D2D communications.

While embodiments have been described in which, of the network elements, the eNB may perform the selection of the overlapping D2D transmission resource pools, in other embodiments other elements of the RAN or core network may select which of the overlapping D2D transmission resource pools is to be used by the UE. This information may be provided to the eNB and/or to the UE directly from the RAN or core network element.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. User equipment (UE) comprising:
a transceiver configured to communicate with another UE through device -to-device (D2D) communication and with an evolved Node-B (eNB); and
processing circuitry configured to:
configure the transceiver to receive, from the eNB, indication of allocation of a plurality of overlapping D2D transmission (TX) resource pools comprising at least one of a Scheduling Assignment (SA) resource pool, a Mode-2 data resource pool, or a discovery resource pool;
use one of the overlapping D2D TX resource pools for transmission to resolve transmission conflict between the D2D TX resource pools;
configure the transceiver to transmit D2D communications to the other UE using the selected one of the overlapping D2D TX resource pools; and
in response to the overlapping D2D TX resource pools comprising overlapping UE-specific Type 2B discovery resource pools:
determine whether the UE-specific Type 2B discovery resource pools overlap at least partially in time, and
discard at least one Type 2B or Type 1discovery message transmission in response to determining that the UE-specific Type 2B discovery resource pools overlap at least partially in time with other Type 2B or Type 1 pools.

2. The UE of claim 1, wherein the processing circuitry is further configured to:
configure the transceiver to receive, from the eNB, an indication of a maximum number of multiple Mode-2 data resource pools to be used by the UE for transmission and a configuration of the Mode-2 data resource pools to be used by the UE for transmission, and
use one of the configured Mode-2 data resource pools at a tune where the one of the configured pools is selected by the UE.

3. The UE of claim 1, wherein:
the overlapping D2D TX resource pools comprise overlapping Mode-2 data resource pools, and
the processing circuitry is further configured to:
determine, in response to at least one of pool usage indices or pool priorities being configured, the at least one of the pool usage indices or pool priorities associated with the overlapping Mode-2 data resource pools and,
in response to the pool usage indices and pool priorities being configured, compare the at least one of pool usage indices or pool priorities associated with the overlapping Mode-2 data resource pools to select one of the overlapping D2D TX resource pools for transmission and, in response to the pool usage indices and pool priorities not being configured, select one of the Mode-2 data resource pools based on UE implementation.

4. The UE of claim 1, wherein:
the overlapping D2D TX resource pools comprise overlapping Mode-2 resource pools, and
the processing circuitry is further configured to:
determine pool usage indices associated with the overlapping Mode-2 resource pools, and
randomly select between the overlapping Mode-2 resource pools, in response to determining that:
the overlapping Mode-2 resource pools have the same usage index, or
the overlapping Mode-2 resource pools have different pool usage indices and the UE is eligible to transmit on any of the overlapping Mode-2 resource pools.

5. The UE of claim 1, wherein the processing circuitry is further configured to:
determine pool usage indices and pool priorities associated with the overlapping D2D TX resource pools, and
compare the pool usage indices and pool priorities associated with the overlapping D2D TX resource pools to select one of the overlapping D2D TX resource pools for transmission.

6. The UE of claim 1, wherein the processing circuitry is further configured to at least one of:
configure the transceiver to transmit Layer 2 signaling to inform UEs about upcoming switching among Mode-2 pools, or configure the transceivers to use one of the D2D TX resource pools to carry L2 control signaling, used to control D2D operation.

7. The UE of claim 1, wherein the processing circuitry is further configured ;
configure the transceiver to receive from the eNB:
UE-specific priority via UE-specific signaling, and
pool priorities associated with the overlapping D2D TX resource pools, and
compare the UE-specific priority with the pool priorities of the overlapping D2D TX resource pools to select one of the overlapping D2D TX resource pools for transmission.

8. An evolved Node-B (eNB) comprising:
a transceiver configured to communicate with user equipment (UE); and
processing circuitry configured to:
configure the transceiver to receive from the UE a request for an allocation of resources for device-to-device (D2D) transmissions;
select a plurality of overlapping D2D TX resource pools each comprising uplink resource blocks, selection of the D2D TX resource pools dependent on characteristics of the D2D TX resource pools, the D2D TX resource pools comprising at least one of a Scheduling Assignment (SA) resource pool, a Mode-2 data resource pool, or a discovery resource pool;
restrict selection of the overlapping D2D TX resource pools to eliminate allocation to the UE of at least one Type 2B discovery TX pool that overlaps at least in frequency with another discovery TX pool; and
configure the transceiver to transmit to the UE an indication of allocation of the selected D2D TX resource pools.

9. The eNB of claim 8, wherein:
the overlapping D2D TX resource pools comprise overlapping Mode-2 data resource pools, and
the processing circuitry is further configured to restrict selection of the overlapping D2D TX resource pools to eliminate allocation of Mode-2 data resource pools to the UE that overlap at least partially in time and frequency.

10. The eNB of claim 8, wherein the processing circuitry is further configured to:
configure the transceiver to transmit to the UE a maximum number of Mode-2 data resource pools to be used by the UE for transmission.

11. The eNB of claim 8, wherein the processing circuitry is further configured to:
restrict selection of the overlapping D2D TX resource pools to eliminate allocation to the UE of Mode-2 data resource pools that overlap in at least time.

12. The eNB of claim 8, wherein the processing circuitry is further configured to:
restrict selection of the overlapping D2D TX resource pools to allocate to the UE orthogonal time resources for Mode-2 data resource pools that overlap in at least time.

13. The eNB of claim 8, wherein the processing circuitry is further configured to:
configure the transceiver to transmit to the UE at least one of pool usage indices and pool priorities associated with different Mode-2 data resource pools and used for pool selection by the UE.

14. The eNB of claim 8, wherein the processing circuitry is further configured to:
restrict selection of the overlapping D2D TX resource pools to eliminate allocation to the UE of Type 2B discovery TX pools that overlap at least partially in time and frequency.

15. The eNB of claim 8, wherein the processing circuitry is further configured to:
restrict selection of the overlapping D2D TX resource pools to eliminate allocation to the UE of UE-specific discovery resources belonging to different Type 2B discovery TX pools that are multiplexed via frequency division multiplexing (FDM).

16. The eNB of claim 8, wherein the processing circuitry is further configured to:
restrict selection of the overlapping D2D TX resource pools to eliminate allocation to UE of a Type 2B discovery TX pool that overlaps at least partially in time and frequency with a Type 1 discovery TX pool.

17. A method of allocating device-to-device (D2D) comunicatio transmission (TX) resource pools comprising:
receiving at user equipment (UE) from an evolved Node-B (eNB) indication of allocation of a plurality of D2D TX resource pools each comprising uplink resource blocks, the D2D TX resource pools comprising at least one of a Scheduling Assignment (SA) resource pool, a Mode-2 data resource pool, and a discovery resource pool, the indication received in radio-resource control (RRC) signaling via system information blocks (SIBs);
determining whether overlap is present between the D2D TX resource pools;
in response to determining that overlap is present, selecting one of the overlapping D2D TX resource pools for transmission to resolve transmission conflict between the D2D TX resource pools, the selecting comprising, in response to the overlapping D2D TX resource pools comprising overlapping UE-specific Type 2B discovery resource pools:
determining whether the UE-specific Type 2B discovery resource pools overlap at least partially in time, and
discarding at least one Type 2B or Type 1 discovery message transmission in response to determining that the UE-specific Type 2B discovery resource pools overlap at least partially in time with another Type 2B and Type 1 discovery transmission; and
transmitting D2D communications to another UE using the selected one of the overlapping D2D TX resource pools.

18. The method of claim 17, wherein:
the overlapping D2D TX resource pools comprise overlapping Mode-2 data resource pools, and
the method further comprises:
determining at least one of pool usage indices and pool priorities associated with overlapping Mode-2 data resource pools, and
at least one of:
a) comparing the at least one of pool usage indices and pool priorities associated with the overlapping Mode-2 data resource pools to select one of the overlapping D2D TX resource pools for transmission, and
b) randomly selecting between the overlapping Mode-2 resource pools in response to determining that:
the overlapping Mode-2 resource pools have the same usage index, or the overlapping Mode-2 resource pools have different pool usage indices and the UE is eligible to transmit on any of the overlapping Mode-2 resource pools.

19. The method of claim 17, further comprising:
transmitting Layer 2 signaling to inform UEs about upcoming switching among Mode-2 pools.

20. The method of claim 17, further comprising:
receiving from the eNB:
UE-specific priority via UE-specific signaling, and
pool priorities associated with the overlapping D2D TX resource pools, and
comparing the UE-specific priority with the pool priorities of the overlapping D2D TX resource pools to select one of the overlapping D2D TX resource pools for transmission.

21. A non-transitory computer-readable storage medium that stores instructions for execution by one or more processors of user equipment (UE) to communicate with another UE using device-to-device (D2D) communication, the one or more processors to configure the UE to:
receive from an evolved Node-B (eNB) an indication of allocation of a plurality of overlapping D2D communication transmission (TX) resource pools each comprising uplink resource blocks, the D2D TX resource pools comprising at least one of a Scheduling Assignment (SA) resource pool, a Mode-2 data resource pool, or a discovery resource pool, the allocation including a maximum number of Mode-2 data resource pools able to be used by the UE for transmission;
select one of the overlapping D2D TX resource pools for transmission to resolve transmission conflict between the D2D TX resource pools, and in response to the overlapping D2D TX resource pools comprising overlapping UE-specific Type 2B discovery resource pools:
determine whether the UE-specific Type 2B discovery resource pools overlap at least partially in time, and
discard at least one Type 2B or Type 1 discovery message transmission in response to determining that the UE-specific Type 2B discovery resource pools overlap at least partially in time with another Type 2B and Type 1 discovery transmission; and
transmit D2D communications to the other UE using the selected one of the overlapping D2D TX resource pools.

22. The non-transitory computer-readable storage medium of claim 21, the processor further configured to:
determine at least one of pool usage indices and pool priorities associated ith overlapping Mode-2 data resource pools, and
at least one of:
a) compare the at least one of pool usage indices and pool priorities associated with the overlapping Mode-2 data resource pools to select one of the overlapping D2D TX resource pools for transmission, and
b) randomly select between the overlapping Mode-2 resource pools in response to determining that:
the overlapping Mode-2 resource pools have the same usage index, or
the overlapping Mode-2 resource pools have different pool usage indices and the UE is eligible to transmit on any of the overlapping Mode-2 resource pools.

23. The non-transitory computer-readable storage medium of claim 21, the processor further configured to select among overlapping D2D Mode-2 data resource pools dependent on at least one of:
whether each D2D Mode-2 data resource pool is related to public service or a commercial service, a type of traffic for each D2D Mode-2 data resource pool, a quality of service (QoS) for each D2D Mode-2 data resource pool, a classification of at least one of the UE and the other UE, whether each D2D Mode-2 data resource pool is related to L2 control and pools for data, whether the UE is to switch from Mode-1 to Mode-2, and whether the UE is in partial coverage of the eNB.

24. The non-transitory computer-readable storage medium of claim 21, the processor further configured to:
transmit Layer 2 signaling to inform UEs about upcoming switching among Mode-2 pools.

* * * * *

UNITED STATES PATENT AND TRADEMARK OFFICE
CERTIFICATE OF CORRECTION

PATENT NO. : 9,888,508 B2
APPLICATION NO. : 14/669340
DATED : February 6, 2018
INVENTOR(S) : Khoryaev et al.

It is certified that error appears in the above-identified patent and that said Letters Patent is hereby corrected as shown below:

In the Claims

In Column 13, Line 53, in Claim 1, delete "device -to-device" and insert --device-to-device-- therefor In Column 14, Line 6, in Claim 1, delete "1discovery" and insert --1 discovery-- therefor In Column 14, Line 20, in Claim 2, delete "tune" and insert --time-- therefor In Column 14, Line 48, in Claim 4, delete "pools," and insert --pools-- therefor

In Column 15, Line 5, in Claim 7, delete "configured ;" and insert --configured to:-- therefor In Column 16, Line 16, in Claim 16, after "to", insert --the--

In Column 16, Lines 19-20, in Claim 17, delete "comununicatio" and insert --communication-- therefor In Column 18, Line 7, in Claim 22, delete "ith" and insert --with-- therefor Signed and Sealed this
Fourth Day of June, 2019

Andrei Iancu
*Director of the United States Patent and Trademark Office*